Feb. 12, 1946. H. LUNDIN 2,394,863
MANUFACTURE OF WATER SOLUBLE SALTS OF MAGNESIUM
Filed July 19, 1943
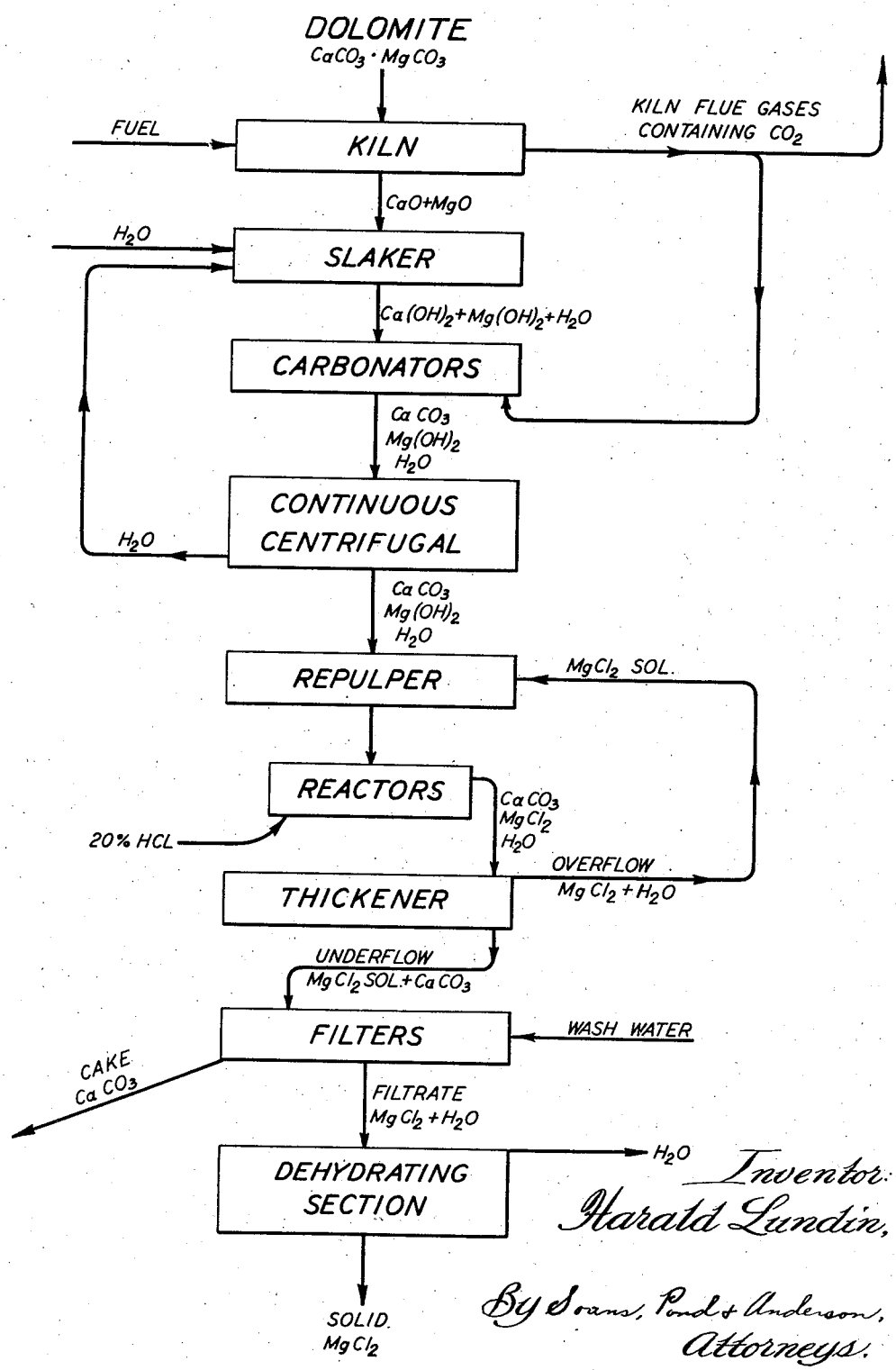

Patented Feb. 12, 1946

2,394,863

UNITED STATES PATENT OFFICE 2,394,863

MANUFACTURE OF WATER-SOLUBLE SALTS OF MAGNESIUM

Harald Lundin, New York, N. Y., assignor to International Minerals & Chemical Corporation, a corporation of New York Application July 19, 1943, Serial No. 495,275

7 Claims. (Cl. 23—91)

The invention relates to the manufacture of water soluble salts of magnesium, and, although susceptible of various applications, it is of particular value in connection with the production of magnesium chloride from materials containing large amounts of calcium along with magnesium, for example dolomite rock. The production of magnesium chloride in a reasonably pure state is of considerable importance at the present time, in view of its use as a source for the production of magnesium metal.

General method

In its broader aspects, the utilization of the invention involves four main phases or features. The first phase involves the obtaining of a milk-like suspension of the hydroxides of calcium and magnesium. Such a suspension can conveniently be obtained by calcining dolomite, thus driving off the $CO_2$ content of the double carbonate of calcium and magnesium to form a mixture of the oxides of calcium and magnesium; then these oxides are slaked using sufficient water to make a reasonably fluid suspension of the hydroxides of calcium and magnesium formed by the slaking operation. Other methods of producing the suspension of the hydroxides may no doubt be employed, but, in view of the fact that dolomite is relatively cheap and obtainable at convenient locations, the use of dolomite or of dolomitic ore as the initial raw material will be found preferable in most cases.

The second phase of the process involves the use of carbon dioxide for the purpose of effecting a selective carbonation of the calcium hydroxide which is suspended in the mixture obtained or provided in the first phase of the process. This carbonation is carried on to the point where the calcium hydroxide is substantially all converted to calcium carbonate, while leaving substantially all of the magnesium hydroxide in the form of hydroxide. Thus, the second stage of the process will result in the formation of a suspension of calcium carbonate and magnesium hydroxide in water, both of course relatively insoluble.

In the third phase of the process, the mixture of calcium carbonate and magnesium hydroxide resulting from the second stage of the process, and carried in a sufficient amount of aqueous liquid, is treated with a reagent which, because of the greater reactivity of the magnesium hydroxide, will react with the magnesium hydroxide to form a soluble salt of magnesium, while not attacking or decomposing the calcium carbonate, which remains in the form of an insoluble suspension.

In the fourth phase of the process, the insoluble calcium carbonate is separated from the magnesium salt solution by mechanical action such as filtration or the equivalent so as to produce a relatively pure solution of the magnesium salt, relatively free from other contaminating minerals such as calcium, and which salt solution may, if desired, be evaporated in any approved manner in order to produce solid magnesium salt.

When the material is to be used for the production of magnesium metal, the soluble salt best fitted for this purpose is magnesium chloride, and therefore, in the third phase of the process above described, the reagent used is one which will result in the conversion of the magnesium hydroxide to magnesium chloride. For example, the reagent may be hydrochloric acid.

Specific example

Dolomite rock, which is considered to be a double carbonate of calcium and magnesium, is calcined at a sufficiently high temperature, for example between 1600° and 1800° F., for a sufficient length of time, for example from 1 to 4 hours, to drive off substantially all of the $CO_2$ and convert the material into the oxides of calcium and magnesium. The dolomite need not be crushed except to the extent necessary to enable it to travel properly through the calcining furnace. Preferably, the calcining is effected in a tubular, slightly inclined, rotary kiln similar to that which is employed in the cement industry.

The calcined material, after being cooled to below 100° C., is then slaked with water at a temperature of about 90° C., sufficient cold water being subsequently added to the batch to produce a relatively cool and fluid suspension of the hydroxides of calcium and magnesium containing from 75 to 150 grams of calcium and magnesium per liter calculated as the oxides. It will be understood that the hydroxide of magnesium is practically insoluble and calcium hydroxide is relatively insoluble, in water, a saturated solution of the latter containing per liter not more than about 2 grams calculated as oxide. Hence, as a practical matter, the percentage of these materials which can be dissolved in the liquid is so extremely small compared with the amount in suspension that these hydroxides may be considered as insoluble, while recognizing, of course, that some degree of solubility perhaps may be essential to a proper reactivity. Similarly, the water of the suspension both before and after the carbonation step contains such a relatively insignificant amount of dissolved material that, for the purposes of this step of the process, it may be considered to be pure water.

Before proceeding further with the process, it may be advisable to employ any convenient type of mechanical or hydraulic classifier for the purpose of removing from the milk or suspension whatever coarse particles may be present in the form of silica originally present in the rock, unslaked dolomite, or other like coarse impurities.

The carbonation step

Selective carbonation of the calcium hydroxide in suspension or in solution (calcium hydroxide is, as is well known, slightly soluble in water) is effected by thoroughly mixing and agitating the batch while introducing $CO_2$. This is supplied in the form of flue gases escaping from the continuous rotary kiln which is employed in the calcining step. These flue gases contain from 20 to 30% of carbon dioxide. Preferably it is advisable to conduct the carbonation step continuously in two or more, preferably three or four stages, the final stage receiving a sufficient supply of carbon dioxide so that, in the absence of other precautions, there would be a slight excess of carbon dioxide which would thus react with some of the magnesium hydroxide to form magnesium carbonate. Therefore, in order to produce a suspension in which the calcium is almost completely in the form of carbonate and the magnesium in the form of the hydroxide, a small supply of raw slurry, i. e., the uncarbonated calcium and magnesium hydroxide suspension, is fed into the last stage of the process. The volume of this small stream or trickle of raw slurry can be conveniently adjusted to the correct amount, so that the final selectively carbonated suspension will be free from calcium hydroxide and will not contain any significant amount of magnesium carbonate. This condition is shown by a sharp drop in the pH and the electrical conductivity of the suspension at the final outflow point.

Although, in certain cases, it may be possible to react the selectively carbonated suspension without any intermediate treatment steps, it is advantageous to filter or centrifuge the suspension so as to permit removal of some of the water. This water is used for slaking the calcined rock and is thus re-cycled continuously. The cake resulting from the removal of water is repulped and is then ready for the third or acidulation stage.

The acidulation step

The reaction may be effected in any type of approved apparatus which will permit an extremely efficient and thorough mixing of the suspension while it is being contacted with the incoming reagent. Preferably, the reagent is admitted to the reaction receptacle by spraying it directly into the fast moving liquid which is continuously introduced into the reaction tank, while the reacted liquid is withdrawn at the top of the tank. Although the batch process may be used in the reaction step, it is found to be somewhat more convenient to use the process as a continuous operation and preferably in two or more stages. At the end of the acidulation step the pH of the clear solution is usually between 6.0 and 6.4

In order to produce a highly concentrated end solution of magnesium chloride, it is desirable to recirculate or re-cycle the solution through the reactors. This is effected by interposing a de-watering and repulping step between the carbonators and the acid reactors, the magnesium chloride solution coming from the reactors being used for the purpose of repulping the cake of $Mg(OH)_2$ and $CaCO_3$ coming from the centrifugals.

Hence, it will be seen that, if the de-watering and repulping step between the carbonating and the reacting equipment is employed, two distinct benefits are obtained. First, I can repulp with the acidulated magesium chloride solution and thereby obtain a stronger final end product, while retaining sufficient volume to enable the final reaction step to be effectively carried out at the proper dilution, and second, the volume of water which must be evaporated in the next or final stage is greatly reduced.

The fourth stage of the process may be a conventional filtration operation for the purpose of recovering the valuable magnesium chloride solution and discarding the solids. However, in view of the desirability of recirculating or re-cycling the magnesium chloride solution so that it can be used in the repulping step prior to acidulation, I prefer to discharge from the acidulation stage directly into a thickener or a similar piece of equipment for the purpose of enabling the magnesium chloride solution to be obtained in reasonably clear condition, free from suspended solids. The heavy slurry from the thickener is filtered in any suitable equipment. It may be advisable to wash the cake before discarding the same, the wash-water being returned to the acid reaction stage, or the re-pulper immediately preceding the reaction tanks.

The reactions are as follows:

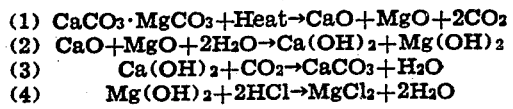

The magnesium chloride solution is evaporated in any suitable de-hydrating equipment, for example by spray drying, in order to obtain the magnesium salt in solid form.

The drawing shows a flow sheet of the preferred process.

It will be seen that the first part of the process changes the calcium and magnesium compound or compounds into a mixture of compounds of calcium and magnesium, one of which, the calcium compound, is more reactive than the corresponding magnesium compound. The next part of the process consists in selectively converting the more reactive calcium compound into a compound which is less reactive than the magnesium compound so that in the following stage of the process the magnesium compound can be selectively reacted to convert it into a compound which can be readily separated from the calcium compound by known methods.

The process as described, in connection with the production of magnesium metal from dolomite, is of particular value in respect of the utilization of by-products for the purpose of carrying out the various reactions. For example, calcining of the dolomite rock results in the production of a supply of $CO_2$ which is ample for effecting proper selective carbonation of the calcium hydroxide. This is apparent from the fact that the $CO_2$ formed in the calcining operation consists not only of the $CO_2$ content of the calcium carbonate constituent of the rock, but it also includes both the $CO_2$ content of the magnesium carbonate constituent and also the $CO_2$ which is present in the products of combustion of the fuel, for example gas or oil, which is used for firing the rotary kiln employed in the calcining operation.

Furthermore, the chlorine for making the hydrochloric acid employed in the acidulating step is largely obtained from the electrolytic cells used in the conversion of chloride to magnesium metal. It is only necessary to supply any losses or deficiency of chlorine which would naturally result from inability to perform the various steps of the combined process including the electrolysis step at 100% efficiency and with 100% recovery and utilization of by-product gas.

I claim:

1. The improvement in the art of manufacturing magnesium chloride, which consists in selectively reacting a suspension of the hydroxides of calcium and magnesium with an amount of $CO_2$ only sufficient to convert substantially all of the suspended calcium hydroxide to the carbonate while leaving substantially all of the suspended magnesium hydroxide in the hydroxide form, then selectively reacting the suspension with hydrochloric acid so as to convert substantially all of the magnesium hydroxide into the soluble chloride while leaving the calcium present in the form of an insoluble carbonate, and then separating the magnesium chloride solution from the solids so as to obtain the magnesium chloride in the form of a substantially pure water solution.

2. The improvement in the art of manufacturing a relatively pure solution of magnesium chloride from a dolomitic rock, which consists in calcining the rock to produce oxides of calcium and magnesium, slaking the calcined material with a sufficient amount of water to produce a liquid suspension of the hydroxides of calcium and magnesium, selectively reacting said suspension with an amount of $CO_2$ sufficient only to convert substantially all of the calcium hydroxide to the insoluble carbonate while leaving substantially all of the magnesium hydroxide in the insoluble hydroxide form, then selectively reacting said solids with hydrochloric acid so as to convert the magnesium hydroxide into the soluble chloride while leaving calcium present in the form of an insoluble carbonate, and then removing the solids.

3. The improvement in the art of manufacturing magnesium chloride from a dolomitic rock, which consists in calcining the rock to produce oxides of calcium and magnesium, slaking the calcined material with a sufficient amount of water to produce a liquid slurry containing a suspension of the hydroxides of calcium and magnesium, selectively reacting said suspended materials with an amount of $CO_2$ sufficient only to convert substantially all of the calcium hydroxide to the insoluble carbonate while leaving substantially all of the magnesium hydroxide in the insoluble hydroxide form, then selectively reacting said solids with hydrochloric acid so as to convert the magnesium hydroxide into the soluble chloride while leaving calcium present in the form an of an insoluble carbonate, then separating the magnesium chloride solution from the solid material, and then evaporating the solution to form solid magnesium chloride.

4. The improvement in the art of manufacturing a relatively pure solution of magnesium chloride, which consists in forming a suspension of undissolved calcium carbonate and undissolved magnesium hydroxide, then selectively reacting the suspension with hydrochloric acid in an amount not in excess of that which is sufficient to convert the magnesium hydroxide into magnesium chloride, and then mechanically separating the suspended solids.

5. The improvement in the art of manufacturing a relatively pure solution of magnesium chloride, which consists in forming an aqueous suspension of relatively insoluble calcium carbonate and relatively insoluble magnesium hydroxide, each of said suspended materials being present in an amount which is several times the amount which will go into water solution, and then selectively reacting said suspension with sufficient HCl only to convert the magnesium hydroxide into magnesium chloride, while leaving the suspended calcium carbonate substantially unchanged, and then removing the solids by filtration.

6. The improvement in the art of treating material containing magnesium and calcium each occurring in the form of a compound relatively insoluble in water, which consists in producing from said material a mixture of relatively insoluble compounds of magnesium and calcium in which the calcium compound is more reactive than the magnesium compound, then selectively reacting the calcium compound with $CO_2$ to form a compound which is less reactive than the magnesium compound but is also relatively insoluble, and then selectively reacting the magnesium compound with HCl to form a soluble magnesium compound.

7. The improvement in the art of manufacturing a relatively pure solution of magnesium chloride, which consists in forming a suspension of undissolved calcium carbonate and undissolved magnesium hydroxide, then vigorously agitating the suspension and simultaneously introducing into the moving suspension an amount of HCl which is not in excess of that which is required to convert the magnesium hydroxide into chloride, and in such manner as to rapidly distribute the added HCl throughout the moving suspension, whereby the magnesium hydroxide is rapidly converted into magnesium chloride while the less reactive calcium carbonate remains unreacted, and then mechanically separating the suspended solids.

HARALD LUNDIN.